Patented June 27, 1939

2,163,659

UNITED STATES PATENT OFFICE 2,163,659

VITAMIN

Albert Gerhardus Boer, Eindhoven, Johannes van Niekerk, Leiden, and Engbert Harmen Reerink and Aart van Wijk, Eindhoven, Netherlands, assignors to N. V. Philips' Gloeilampenfabrieken, Eindhoven, Netherlands No Drawing. Application July 6, 1935, Serial No. 30,156. In Germany June 19, 1935

12 Claims. (Cl. 260—397)

Our invention relates to the class of substances of paramount biological interest commonly designated as vitamins, and more especially to the substance, or group of substances, belonging to this class, which has hitherto been known under the name of "antirachitic vitamin" or "vitamin D" and which is capable of preventing or curing rickets. It has particular reference to that modification of vitamin D which is especially active for chicks.

Our invention relates furthermore to the precursor, the so-called "provitamin D", from which that vitamin D can be prepared by irradiation with ultraviolet light.

The invention also includes the processes of producing these substances.

The history of the research work done in this field of science, as written for instance by Waddell and published in July 1934 in the Journal of Biological Chemistry (vol. 105, p. 711-739) reveals incessant, but on the whole fruitless efforts, on the part of quite a number of highly skilled investigators, to trace the nature and constitution of the antirachitic principle especially active for chicks and eventually to isolate and produce it, if not on a large scale, at least in the laboratory. Waddell, as far as we are informed, was the last and most successful worker in this field, and his discovery, that the antirachitic factor of irradiated cholesterol is as potent for chicks as the vitamin D of cod liver oil, the longest known antirachitic remedy, and that the provitamin constituent of cholesterol is a substance different from ergosterol, which one had hitherto believed to be the sole precursor of vitamin D, was a great step forward in this still mostly unknown field of biological science. However important his findings may have been from a scientific point of view, they did not contribute much to the solution of the problem of how to isolate this active principle or its precursor and, which is still more important, to produce it on a large scale so as to bring it within reach of every poultry farmer.

All we knew with regard to manufacture of antirachitic active preparations on an industrial scale was, that they could be produced by irradiation, with ultra-violet rays, of animal and vegetable matter containing unsaponifiable lipoids, and before Waddell's publication the provitamin of all the materials used was believed to be identical with ergosterol in every case. It has been furthermore shown that, while the artificial vitamin D produced in ergosterol by irradiation heals rickets in the same way as the natural vitamin D in cod liver oil, there exists a marked difference between these two vitamins. It had been found that preparations of these two vitamins possessing the same potencies—computed by comparison with the international standard preparations for vitamin D on rats—when tested on chicks, did not present the same activity, but that from 30 to 50 times as many "international units" of irradiated ergosterol were required to produce the same antirachitic effect, as of cod liver oil. Waddell found that irradiated commercial cholesterol has about the same activity for chicks as cod liver oil, if compared on the base of the same number of international rat units.

The highest amount of provitamin ever encountered by prior investigators in cholesterol (from the egg of a hen fed with ergosterol) was 0.32%, and in those cases known to us, where no ergosterol had been fed to the animals, not even this figure has ever been reached. Now, since according to Waddell's paper he never obtained more than 5 international units per milligram irradiated cholesterol and since our own investigations had convinced us, that it would be impossible, according to the methods hitherto followed, even if starting from a cholesterol preparation containing as much as 0.3 per cent provitamin, to obtain more than 30 international units per mg. irradiated cholesterol; since moreover the low degree of solubility of cholesterol in oil would not favor the commercial preparation of solutions possessing more than 200 to 300 international units per cubic centimetre, and in view of the high costs of production we concluded that the cholesterol material hitherto used was not a suitable source of provitamin production and that we would have to search for another more prolific and easily available raw material.

We have succeeded in tracing not only such a material available everywhere and in unlimited quantity, but also the means for recovering from this material on a commercial scale preparations rich in antirachitic principle especially active on chicks, and we are now able to not only provide the market at low cost with high percentage provitamin D preparations excellently suited for the production of the said antirachitic principle, but also to isolate the chicken-provitamin D as a well-defined crystalline compound. Our invention, therefore, comprises the method of producing preparations rich in provitamin by starting from materials never before tested for such purpose, the new preparations obtained in this manner, further the pure chicken provitamin D itself and finally the antirachitically active preparations derived therefrom.

We are now going to describe our invention and how the same is to be performed.

The Starting Material

As above explained, the provitamin D content of the cholesterol material hitherto used never exceeded 0.32 per cent.

In searching for a more abundant source of chicken provitamin D we finally allowed ourselves to be guided by a consideration, which at first sight appears to be little founded; it occurred to us that, since ergosterol, although traceable in all plants, is far more preponderant among the sterols of the lower plants (cryptogams) than among those of the higher plants (phanerogams), possibly similar conditions might prevail amongst animals in regard to the contents of that sterol in which irradiation with ultraviolet rays generates the active vitamin principle. We thought that this provitamin-sterol might be much more preponderant among the sterols of the lower animals (Invertebrata) than in the cholesterol among those of the higher animals (Vertebrata). Following this idea we started an investigation of the sterols of the Invertebrata, on which as sources of the antirachitically activatable provitamin nothing could be found in literature. This investigation was not encouraged by the fact that in many instances the sterols found in these materials had been proved to be different from cholesterol, so that it seemed doubtful whether the provitamin D, which we might ultimately trace therein, might be the chicken-provitamin D we were looking after.

In view of an extended series of tests made with sterols recovered from various kinds of Invertebrata, including Annelida, Arthropoda and Mollusca, we feel authorized to say that we have in fact traced the first and probably the only way of producing the chicken-provitamin D on the largest possible scale. For the sterol fraction of most of the animals of the large family of Invertebrata, which we have tested, have been found to yield many times, and some up to and beyond the hundredfold, of the yield of provitamin D normally recoverable from the sterols of Vertebrata.

Obviously, since these raw materials are living organisms, the provitamin content in different individuals of the same species will not be constant, but is bound to vary according to the stage of development (age), conditions of living, season, climate etc.

Method of Producing Preparations, Rich in Chicken Provitamin D

In the preparation of unsaponifiable lipoids and sterols from Invertebrata we had to keep in mind that the provitamin is a rather unstable substance. We prefer starting with whole animals in a state as fresh as possible, which are finely comminuted, for instance in a meat chopper, or in a grinding mill adapted for the purpose. The mashed material is dehydrated with alcohol or better still in a rotating vacuum drier. If alcohol is used, it is finally filtered with suction, diluted to about 50% and the fatty matter extracted therefrom with a low boiling solvent such as light petroleum. The dehydrated material is next extracted with light petroleum, until the fat is completely removed, the petroleum fractions are united, washed with water and dried with anhydrous sodium sulfate. We may however also extract the dried material in an ordinary extractor, or dry and extract it in a rotating vacuum extractor, however taking care not to raise the temperature above 50° C. or thereabouts. The light petroleum is distilled off and the fatty residue saponified at a moderate temperature with a solution of 50 parts by weight KOH in 50 parts distilled water and 500 parts alcohol of 96%, calculated on 100 parts of the residue. This mixture is heated two hours on a steam bath under the reflux condenser. The soap solution is cooled and diluted with distilled water to an alcohol concentration of 15 to 20%. From this solution the unsaponifiable fraction may for instance be extracted five times with ethyl ether, the ether washed five times with distilled water and distilled off, care being taken that the contact with ether be as short as possible.

Alternatively the diluted soap solution may be treated with a solution of a calcium salt, equivalent to the amount of KOH used, whereby the unsaponifiable fraction is precipitated along with the lime soaps. The KOH in excess is converted into $K_2CO_3$ by adding $CO_2$ or a $NaHCO_3$-solution, followed by filtering and extracting the precipitate several times with acetone and finally evaporating the acetone in vacuo and drying the residue.

From this unsaponifiable residue the sterol fraction is prepared by recrystallisation from ethyl alcohol and methyl alcohol. In many cases the unsaponifiable matter contains large proportions of oils or wax-like material, relatively insoluble in methyl alcohol, that can be decanted or filtered off. In these cases the yield of sterol fraction is impaired, unless the mother liquors are treated further in a manner adapted to the circumstances, because the impurities tend to keep the sterol in solution. If the unsaponifiable matter should contain a high percentage of coloring matter such as for instance carotinoids, special care should be taken to avoid losses of provitamin by the destructive influence of light and the oxygen of the air.

We have tried to isolate the sterol fraction by precipitation with digitonin and extracting the precipitate with boiling xylene in the usual way, but this process is unsuitable because the provitamin is easily destroyed. For the purification of the sterol fraction, which may be effected for instance by recrystallisation or by distillation in a high vacuum, no treatment with adsorbents, such as charcoal, should be resorted to, because this also leads to destruction of the provitamin.

After the sterol fraction has been purified sufficiently, the absorption spectrum is measured in the usual way; the absorption spectrum is compared with that of ergosterol, and the amount of ergosterol, that would give the same absorption, is calculated in per cents of the amount of sterol used. This percentage is used to indicate the amount of provitamin present.

As will be seen from the foregoing description, we are operating with the fresh raw material, taking care to avoid heating and quite especially boiling with water and drying with steam.

Activation of the Chicken-Provitamin D Preparations by Irradiation

The sterol fraction may be activated by irradiation methods which have proved to be suitable for activating ergosterol.

We prefer to operate in complete absence of oxygen under continual stirring of the solution with light from which the wave lengths below 284 millimicrons have been filtered off by a xylene filter, and to stop the irradiation before more than about 50% of the provitamin has been transformed, as described in our paper in Biochemical Journal 25, 1001-1002 (1931). For the present experiments we used an all-quartz absorption cell connected with the irradiation apparatus, and we dissolved the different sterol fractions in ether free of peroxide in such a concentration that the absorption was practically the same in every case. We chose the concentration so small that practically the whole energy of the mercury line 313 millimicrons and the main part of the line 302 millimicrons were not absorbed in the irradiation apparatus.

After irradiation the absorption spectrum of the irradiated solution can be measured again.

We found that the photochemical reaction as represented by changes in the absorption spectrum is the same as in the case of ergosterol (see our paper in Biochem. Journ. 23, 1929, 1294). Therefore the absorption spectrum after irradiation enabled us to calculate the degree of transformation in the same way as with ergosterol; and the rat tests have confirmed this in every respect.

Irradiation being completed, the solution was poured into antirachitically inactive arachis oil in vacuo and the ether was distilled off. The oil solution was then diluted to the proper concentration for the rat and chicken tests.

THE CHICKEN TEST

In the chicken test we started with one-day old chickens which were fed during 3-4 weeks on a ration consisting of 12% casein, 25% ground whole wheat, 59% ground whole yellow maize, 1% dried yeast, 2% $CaCO_3$ and 1% NaCl, 1½% arachis oil containing the vitamin D preparation being added to the mixture.

We found that 70 international units of cod-liver oil vitamin D per 100 grams ration was enough to guarantee a normal growth and bone-formation of the chickens up to 3 or 4 weeks. A smaller amount of vitamin D led to an abnormal bone-formation, which could be detected radiographically. We have thus been able to perform a quantitative estimation of vitamin D with chickens as test animals, which need not be gone into in detail.

We will only give a representative example: 181 mgs. of a preparation of sterol from mussels, containing, according to the spectrum, 12½ per cent provitamin D, were dissolved in ether free from peroxide and this solution was irradiated under continuous stirring in vacuo with the light, filtered through a xylene solution, of a mercury vapor quartz lamp, until about 30 to 35 per cent of the provitamin present in the substance was transformed. The irradiated solution, while still in the vacuum, was then entered into 190 cubic centimetres arachis oil and the ether evaporated in vacuo. The antirachitic effect of the oil solution was tested on rats in comparison to the international standard solution of vitamin D and further on chicks in comparison with a cod-liver oil containing 100 international units (rat units) vitamin D per cubic centimetre. The rat test showed that the oil solution contained about 750 international units per cubic centimetre. The chick test showed the oil solution to be about 7½ times stronger than the cod-liver oil. Thus 181 milligrams sterol from mussels forming the starting material yielded about 140,000 international units of vitamin D, which is about 800 international units per milligram.

EXAMPLES OF THE PRODUCTION OF HIGH PERCENTAGE PREPARATIONS OF CHICKEN PROVITAMIN D

In the practical operation of the process of producing preparations rich in provitamin we proceeded for instance as follows:—

MOLLUSCA

Example 1

4.1 kilograms sea mussel (*Mytilus edulis*), from which the shells were removed, were comminuted in a meat chopper and dried in vacuo at about 50° C. The dried mass was extracted with 3.5 liters petroleum ether boiling within the range of 40-60° C., the extraction being effected with three portions of the ether. The extract was washed with water and dried with $Na_2SO_4$. After filtration the ether was distilled off and the 45 grams fatty matter, which remained over, were saponified by heating them during two hours under the reflux condenser with a solution of 20 grams KOH in 20 cubic centimetres water and 200 cubic centimetres alcohol of 96%. After being cooled, the soap solution was poured into 1 litre distilled water and the aqueous soap solution shaken five times with ethyl ether, 1.1 litres of which were required altogether. The etheric solution was now shaken five times with distilled water, 100 cubic centimetres water being used each time, whereupon it was dried with $Na_2SO_4$ and filtered. On removal of the ether by distillation there remained over a solid reddish yellow mass weighing about 7.5 grams. This crude unsaponifiable fraction of the fatty matter was now recrystallized from 50 cubic centimetres alcohol of 96%, once more from 25 cubic centimetres of such alcohol and finally from 110 cubic centimetres methyl alcohol.

The sterol fraction recovered in this manner weighed 2.5 grams and proved to be a light yellow crystalline mass. By measuring the absorption spectrum of these crystals we found the characteristic absorption bands of the provitamin to be present in a strength indicating a provitamin content of the substance of 16 per cent. As mentioned above, we took care to keep the treatment with ether as short as possible. The provitamin content of 16% of the sterol fraction from mussels, as described in this example, corresponds after irradiation to an antirachitic activity of about 1600 international units per milligram.

Example 2

900 grams oysters (*Ostrea edulis*) were comminuted, after removal of the shells, in a meat chopper and the mass treated twice with 900 cubic centimetres alcohol of 96%. The alcohol was carefully filtered by suction through a Büchner filter and the combined filtrates diluted with water to a strength of about 50%, whereupon the fatty constituents dissolved in alcohol were extracted by shaking with 2 litres petroleum ether boiling from 40 to 60° C. This ether was now added to the comminuted mass, which had been extracted with alcohol, and after filtration this mass was extracted twice with about 500 cubic centimetres petroleum ether. The whole of the ether was now washed with water, dried with $Na_2SO_4$, filtered and the ether distilled off. There remained over 14.7 grams fatty matter, which was now heated 2 hours under the reflux condenser with a solution of 7.5 grams KOH in 7.5 cubic centimetres water and 50 cubic centimetres alcohol of 96%. After cooling the soap solution was poured into 250 cubic centimetres distilled water and the unsaponifiable fraction extracted from the aqueous soap solution with ethyl ether, as described with reference to Example 1. By recrystallization from alcohol of 96% and twofold recrystallization from methyl alcohol, we obtained the sterol fraction under the form of a white crystalline mass weighing about 0.60 grams. The absorption spectrum showed the crystals to contain 3% provitamin, which means that by irradiation of the preparation an antirachitic activity of about 300 international units per milligram can be produced.

Example 3

9 kilograms swan mussels (*Anodonta cygnea*) were crushed together with their shells in a mortar and treated as described with reference to Example 2. We thus obtained 10.3 grams fatty matter which we saponified with a solution of 5 grams KOH in 5 cubic centimetres water and 50 cubic centimetres alcohol of 96%. From this soap we prepared the unsaponifiable fraction in the manner described with reference to the preceding example. From the unsaponifiable matter weighing 2.65 grams we obtained by recrystallisation 1.0 gram of the light yellow crystalline sterol fraction containing 8% provitamin, corresponding, after irradiation, to an antirachitic activity of about 800 international units per milligram.

Example 4

2.2 kilograms periwinkle (*Littorina littorea*) were crushed together with their shells in a mortar and then comminuted in a meat chopper, whereupon the mass was treated with 2 litres alcohol. After dilution with water the alcohol was shaken with petroleum ether and the dried mass also extracted with petroleum ether. After washing, drying and evaporating the ether, we obtained a residual fatty matter weighing 11.8 grams, which was now saponified by heating it 2 hours under the reflux condenser with a solution of 6 grams KOH in 6 grams water and 50 cubic centimetres alcohol of 96%. The soap solution was diluted with 250 cubic centimetres distilled water and the unsaponifiable fraction separated by means of ethyl ether. We thus obtained 1.85 grams unsaponifiable matter from which we produced by recrystallization from alcohol and methyl alcohol the sterol fraction under the form of light yellow crystals weighing 0.49 gram.

The absorption spectrum showed that these crystals contained 26 per cent provitamin D corresponding after irradiation to an activity of about 2600 international units per milligram.

Claims directed to this embodiment of our invention are being presented in our copending divisional application Ser. No. 272,698, filed May 9, 1939.

Example 5

2.4 kilograms common whelk (*Buccinum undatum*) were deprived of their shells and the flesh (1.2 kilograms) comminuted in a meat chopper and treated as described with reference to Examples 2 and 3 for the recovery of the fatty matter. We thus obtained 13.0 grams of such matter which we now saponified with a solution of 6.5 grams KOH in 6.5 cubic centimetres water and 50 cubic centimetres alcohol of 96%. From this soap we prepared the unsaponifiable fraction in the manner described with reference to the preceding examples. From the unsaponifiable matter weighing 2.4 grams we obtained by recrystallization 0.96% gram of the sterol fraction, which form almost white crystals containing 10 per cent provitamin corresponding after irradiation to an antirachitic activity of about 1000 international units per milligram.

Example 6

200 grams snails (*Limax agrestis*) were comminuted in a meat chopper and treated with alcohol and petroleum ether as described with reference to Example 2. The fatty matter weighing 3.6 grams was saponified with a solution of 2 grams KOH in 2 cubic centimetres water and 25 cubic centimetres alcohol of 96%, and the unsaponifiable part extracted with ethyl ether. There resulted 0.45 gram which, on being recrystallised from alcohol and methyl alcohol, yielded 90 mgs. of the sterol fraction, a white crystalline substance. This preparation was found to contain 3.2 per cent provitamin D, corresponding, after irradiation, to an antirachitic activity of about 300 international units per milligram.

ARTHROPODA

Example 7

Two edible crabs (*Cancer pagurus*) weighing 690 grams were crushed in a mortar and the flesh comminuted in a meat chopper and after drying with alcohol extracted with petroleum ether as described with reference to Example 2. The fatty matter weighing 19 grams was saponified with a solution of 9.5 grams KOH in 9.5 cubic centimetres water and 65 cubic centimetres alcohol of 96%. The unsaponifiable fraction was extracted with ethyl ether as described with reference to Example 2. From the 1.5 grams crude unsaponifiable matter we obtained by recrystallization from alcohol and methyl alcohol 0.25 gram of the sterol fraction forming perfectly white crystals. This preparation was found to contain 2.7 per cent provitamin corresponding after irradiation to an antirachitic activity of about 250 international units per milligram.

Example 8

524 grams meal-worms (*Tenebrio molitor*) were comminuted in a meat chopper and treated with alcohol and petroleum ether as described with reference to Example 2. The fatty matter weighing 44.5 grams was saponified with a solution of 22 grams KOH in 22 cubic centimetres water and 150 cubic centimetres alcohol of 96% and the unsaponifiable part extracted with ethyl ether. There resulted 1.08 grams, which on being recrystallized from alcohol and 4 times from methyl alcohol yielded a difficultly-soluble butter-like substance and 0.14 gram of the sterol fraction, which formed an almost white crytsal powder. The preparation was found to contain 11 per cent provitamin corresponding after irradiation to an antirachitic activity of about 100 international units per milligram.

Example 9

174 grams diving beetles (*Dytiscus marginalis*) were comminuted in a meat chopper and treated with alcohol and petroleum ether as described with reference to Example 2. The fatty matter weighing 4.7 grams was saponified with a solution of 2.5 grams KOH in 2.5 cubic centimetres water and 25 cubic centimetres alcohol of 96% and the unsaponifiable part extracted with ethyl ether. There resulted 0.45 gram which was found to consist for a very large part of a waxy material. After recrystallization from alcohol (2 times) and methyl alcohol (4 times) only 12 mgs.

of a white crystalline sterol fraction were obtained, containing 4 per cent provitamin corresponding, after irradiation, to an antirachitic activity of about 400 international units per milligram.

Example 10

5.4 grams locust's eggs (*Caraustus morosus*) were crushed in a mortar with coarse sand and extracted with alcohol and petroleum ether as described with reference to Example 2. We obtained 0.40 gram fatty material which we saponified and extracted with ether. The unsaponifiable matter weighing 36 mgs. was recrystallised twice from methyl alcohol, yielding 3 mgs. of a still impure sterol fraction containing 2½ per cent provitamin, which after irradiation corresponds to an antirachitic activity of about 250 international units per milligram.

ANNELIDA

Example 11

404 grams earth-worms (*Lumbricus*) were comminuted in a meat chopper and treated with alcohol and petroleum ether as described with reference to Example 2. The extracted matter weighing 4.3 grams was saponified with a solution of 2.2 grams KOH in 2.2 cubic centimetres water and 16 cubic centimetres alcohol. From the soap solution were extracted with ethyl ether 0.9 gram unsaponifiable matter which on being recrystallized from alcohol and methyl alcohol yielded a sterol fraction of white crystals weighing 0.3 gram. This preparation was found to contain 11 per cent provitamin corresponding after irradiation to an antirachitic activity of about 1100 international units.

Example 12

500 grams leeches (*Hirudo medicinalis*) were comminuted in a meat chopper and treated with alcohol and petroleum ether as described with reference to Example 2. The extract weighing 7.4 grams was saponified with a solution of 3.7 grams KOH in 3.7 cubic centimetres water and 25 cubic centimetres alcohol and there were obtained 1.5 grams unsaponifiable matter which, after recrystallisation from alcohol and methyl alcohol, yielded 0.86 gram of the sterol fraction of white crystals containing 4.2 per cent provitamin corresponding after irradiation to an antirachitic activity of about 400 international units per milligram.

Example 13

800 grams small fresh water-worms (*Tubifex*) were comminuted in a meat chopper and treated with alcohol and petroleum ether as described with reference to Example 2. The extract weighing 13.0 grams was saponified and the unsaponifiable part was extracted with ethyl ether. We obtained 2.5 grams which were recrystallised from alcohol and methyl alcohol, yielding a white crystalline sterol fraction weighing 1.12 grams. These crystals were found to contain 17 per cent provitamin corresponding, after irradiation, to an antirachitic activity of about 1700 international units per milligram.

As compared with the maximum of 5 international units per milligram of irradiated cholesterol obtained by Waddell and the fraction of one per cent provitamin content of any cholesterol preparation hitherto obtained from vertebrate animals, the sterol fraction of the invertebrate animals tested according to the above examples showed the chicken provitamin D contents to vary between 2.5 and 26 per cent, being in any case higher than 2 per cent, the activity of the irradiated products being higher than 50 and in the above examples between 250 and 2600 international units per milligram.

Obviously, as stated at the beginning, the figures found in our tests are bound to vary according to the stage of development (age) of the animals, to their conditions of living, to the season in which they are caught, to eliminate conditions and so on.

PREPARATION OF THE CRYSTALLIZED CHICKEN-PROVITAMIN D

We have further succeeded in concentrating the sterols obtainable from the fatty matter in invertebrate animals to the extent of enabling us to produce a pure crystallized provitamin melting at 149.5 to 150° C., whose specific rotation, measured in benzene, is $[\alpha]_D = -118°$.

In the production of the pure provitamin D we converted part of the sterol fraction recovered in accordance with Example 1 (sea mussels) into the acetate by treating same with acetic anhydride and pyridine. The mixture of acetates thus obtained was dissolved in a mixture of benzene and light petroleum and adsorbed in a column of alumina prepared according to Brockmann. By lixiviation with the same solvent a large portion of the acetates of the inactivatable sterols could be removed and the adsorbed material was finally recovered by lixiviation with benzene, to which some methyl alcohol was admixed. In this way we succeeded in concentrating the provitamin acetate about two and a half times in a single adsorption operation. Starting from an acetate mixture containing about 7 per cent provitamin acetate, we obtained, after 3 adsorption operations, a mixture containing about 60 per cent provitamin acetate. This mixture was recrystallized three times from methyl alcohol and yielded an acetate, the absorption spectrum of which corresponded to the spectrum of 94% by weight of ergosterol acetate. Three further recrystallizations did not materially alter this absorption spectrum; the melting point changed only slightly.

We consider this acetate to be the pure provitamin acetate melting at 160 to 161° C. (uncorrected) and having an $[\alpha]_D = -78°$ (dissolved in benzene). For the sake of comparison we note the melting point of pure ergosterol acetate as 175.3 to 176° C. (uncorrected) and $[\alpha]_D = -96°$. This shows that the provitamin from the sterol here used as starting material is different from ergosterol.

The provitamin itself was obtained by saponification of the acetate. After many recrystallizations from methyl alcohol its melting point was found at 149.5 to 150° C. in contradistinction to ergosterol melting at 163.5 to 164° C. The specific rotation of the chicken-provitamin D in benzene $[\alpha]_D$ was found to be $-118°$, as against $-136°$ for ergosterol.

The absoption spectrum of the pure provitamin differs only slightly from that of ergosterol. This pure provitamin is further differentiated from ergosterol by the fact that, whereas the active principle formed in ergosterol (calciferol) has an activity of about 1000 international chick units per milligram, the active principle formed in said provitamin has an activity ranging from about 10,000 to 40,00 international chick units per milligram.

This pure provitamin is a typical sterol, which is precipitated by digitonin in alcoholic solution. It is decomposed relatively rapidly in etheric solution and in boiling acetone, if exposed to the air. In short, it behaves rather like ergosterol, but it seems to be a little more susceptible to oxidation. Since we have not been able to isolate the provitamin from the cholesterol of the Vertebrata (owing to the very low concentration in which it is found there) we cannot say whether our provitamin is identical with that contained in the cholesterol of the Vertebrata. We are however inclined to think that they are not identical, for the following reason: The main sterol from the mussels and other Lamellibranchiata is—according to Bergmann (Journal Biochemical Chemistry 104, 317, 553,—1934—)—the ostreasterol, an isomeride of stigma-sterol, having the composition $C_{29}H_{48}O$, while the formula for cholesterol is $C_{27}H_{46}O$. It appears reasonable to assume that the provitamin occurring as a constituent of the ostrea-sterol has also 29 C-atoms and the formula $C_{29}H_{46}O$ and that the provitamin in cholesterol has 27 C-atoms and the formula $C_{27}H_{42}O$. We wish however to state expressly that this is nothing but an assumption on our part. The formula of the mussel-provitamin is now being checked by analysis of the provitamin itself and of several of its derivatives.

We have found that the spectroscopically pure provitamins and their acetates produced from other Invertebrata have melting points and rotation angles which slightly differ from those found for mussel provitamin. However, a common characteristic of these provitamins is that the melting point of their acetates is higher than that of the provitamin.

For earthworm (Example 11) the spectroscopically pure provitamin has a melting point of about 150° C. to about 151° C. and a specific rotation in benzene of $(\alpha)_D = -133°$, and its acetate has a melting point of about 155° C. to about 159° C. and a specific rotation in benzene of $(\alpha)_D = -91.5°$.

For Tubifex (Example 13) the spectroscopically pure provitamin has a melting point of about 143° C. to about 146° C. and a specific rotation in benzene of $(\alpha)_D = -127°$, and its acetate has a melting point of about 150.5° C. to about 154.5° C. and a specific rotation in benzene of $(\alpha)_D = -87°$.

Various changes may be made in the details disclosed in the foregoing specification without departing from the invention or sacrificing the advantages thereof.

The term "international chick unit" as used in the claims is to be understood to mean the same antirachitic activity on chicks as would be produced by the quantity of cod liver oil which in the rat test possesses an antirachitic activity of one international unit.

Claims directed to the process of producing concentrated provitamin preparations are being presented in our copending divisional application Ser. No. 272,699, filed May 9, 1939.

In the claims affixed to this specification no selection of any particular modification of the invention is intended to the exclusion of other modifications thereof and the right to subsequently make claim in the present application to any modification not covered by these claims expressly reserved.

We claim:

1. A process for producing a pure provitamin D having a melting point of about 149.5° C. to about 150° C. and a specific rotation in benzene of $(\alpha)_D = -118°$ and whose acetate has a melting point of about 160° C. to about 161° C. and a specific rotation in benzene of $(\alpha)_D = -78°$ which comprises extracting the fatty material from sea mussels, saponifying said fatty material with a saponifying agent, extracting therefrom the unsaponifiable portion with an organic solvent, crystallizing such unsaponifiable portion, converting the crystallized product into the acetate, dissolving said acetate in a solvent, adsorbing the dissolved acetate on alumina, removing therefrom the unactivatable sterols with a mixture of benzene and light petroleum, obtaining the activatable sterol acetate by lixiviating the adsorbed material with a mixture of benzene and methyl alcohol, crystallizing said activatable sterol acetate and saponifying the resulting material in order to obtain the pure provitamin D.

2. A process for producing vitamin D which comprises subjecting to ultra-violet light, for a sufficient period to produce activation, the provitamin produced by extracting the fatty material from invertebrate animals, saponifying said fatty material with a saponifying agent, extracting therefrom the unsaponifiable portion with a solvent, crystallizing such unsaponifiable portion and converting the crystallized product into the acetate, dissolving said acetate in a solvent, adsorbing the dissolved acetate on alumina, removing therefrom the unactivatable sterols by lixiviating the adsorbed material with a mixture of benzene and light petroleum, obtaining the activatable sterol acetate by lixiviating the adsorbed material with a mixture of benzene and methyl alcohol, and crystallizing said activatable sterol acetate and saponifying the resulting material.

3. A pure provitamin D having a melting point of about 149.5° C. to about 150° C. and a specific rotation in benzene of $(\alpha)_D = -118°$ and whose acetate has a melting point of about 160° C. to about 161° C. and a specific rotation in benzene of $(\alpha)_D = -78°$.

4. A process of producing a provitamin D which in its pure state has a melting point of about 149.5° C. to about 150° C. and a specific rotation in benzene of $(\alpha)_D$ equal to about $-118°$ and whose acetate has a melting point of about 160° C. to about 161° C. and a specific rotation in benzene of $(\alpha)_D$ equal to about $-78°$, which comprises extracting the fatty material from mussels, saponifying said fatty material with a saponifying agent, and extracting therefrom the unsaponifiable portion with an organic solvent.

5. A provitamin D derived from invertebrate animals which provitamin in its pure state has a melting point of about 149.5° C. to about 150° C. and a specific rotation in benzene of $(\alpha)_D$ equal to about $-118°$ and whose acetate has a melting point of about 160° C. to about 161° C. and a specific rotation in benzene of $(\alpha)_D$ equal to about $-78°$.

6. A provitamin D derived from Tubifex which provitamin in its spectroscopically pure state has a melting point of about 143° C. to about 146° C. and a specific rotation in benzene of $(\alpha)_D$ equal to about $-127°$ and whose acetate has a melting point of about 150.5° C. to about 154.5° C. and a specific rotation in benzene of $(\alpha)_D$ equals to about $-87°$.

7. A provitamin D derived from earthworms which provitamin in its spectroscopically pure state has a melting point of about 150° C. to about 151° C. and a specific rotation in benzene of $(\alpha)_D$ equal to about $-133°$ and whose acetate has a melting point of about 155° C. to about 159° C. and a specific rotation in benzene of $(\alpha)_D$ equal to about $-91.5°$.

8. A process of producing a provitamin D which in its pure state has a melting point of about 143° C. to about 146° C. and a specific rotation in benzene of $(\alpha)_D$ equal to about $-127°$ and whose acetate has a melting point of about 150.5° C. to about 154.5° C. and a specific rotation in benzene of $(\alpha)_D$ equal to about $-87°$, which comprises extracting the fatty material from mussels, saponifying said fatty material with a saponifying agent, and extracting therefrom the unsaponifiable portion with an organic solvent.

9. A process of producing a provitamin D which in its pure state has a melting point of about 150° C. to about 151° C. and a specific rotation in benzene of $(\alpha)_D$ equal to about $-133°$ and whose acetate has a melting point of about 155° C. to about 159° C. and a specific rotation in benzene of $(\alpha)_D$ equal to about $-91.5°$ C. which comprises extracting the fatty material from mussels, saponifying said fatty material with a saponifying agent, and extracting therefrom the unsaponifiable portion with an organic solvent.

10. A process of producing vitamin D comprising the step of antirachitically activating a provitamin D derived from Tubifex which provitamin in its spectroscopically pure state has a melting point of about 143° C. to about 146° C. and a specific rotation in benzene of $(\alpha)_D$ equal to about $-127°$ and whose acetate has a melting point of about 150.5° C. to about 154.5° C. and a specific rotation in benzene of $(\alpha)_D$ equal to about $-87°$.

11. A process of producing vitamin D comprising the step of antirachitically activating a provitamin D derived from earthworms which provitamin in its spectroscopically pure state has a melting point of about 150° C. to about 151° C. and a specific rotation in benzene of $(\alpha)_D$ equal to about $-133°$ and whose acetate has a melting point of about 155° C. to about 159° C. and a specific rotation in benzene of $(\alpha)_D$ equal to about $-91.5°$.

12. A process of producing vitamin D comprising the step of antirachitically activating a provitamin D derived from mussels which provitamin in its pure state has a melting point of about 149.5° C. to about 150° C. and a specific rotation in benzene of $(\alpha)_D$ equal to about $-118°$ and whose acetate has a melting point of about 160° C. to about 161° C. and a specific rotation in benzene of $(\alpha)_D$ equal to about $-78°$.

ALBERT GERHARDUS BOER.
JOHANNES VAN NIEKERK.
ENGBERT HARMEN REERINK.
AART VAN WIJK.

---

CERTIFICATE OF CORRECTION.

Patent No. 2,163,659.     June 27, 1939.

ALBERT GERHARDUS BOER, ET AL.

It is hereby certified that error appears in the printed specification of the above numbered patent requiring correction as follows: Page 1, first column, line 51, for the word "has" read had; page 2, first column, line 48, after "of" insert the; page 4, first column, line 75, for "0.96% gram" read 0.96 gram; page 5, second column, line 10, for the word "eliminate" read climatic; line 73, for "40,00" read 40,000; page 6, second column, line 65, claim 6, for "Tubifex" read tubifex; line 71, same claim, for the word "equals" read equal; page 7, first column, line 14, claim 8, for "mussels" read tubifex; line 26, claim 9, for "mussels" read earthworms; and that the said Letters Patent should be read with this correction therein that the same may conform to the record of the case in the Patent Office.

Signed and sealed this 8th day of August, A. D. 1939.

(Seal)                         Leslie Frazer,
Acting Commissioner of Patents.

about 151° C. and a specific rotation in benzene of $(\alpha)_D$ equal to about $-133°$ and whose acetate has a melting point of about 155° C. to about 159° C. and a specific rotation in benzene of $(\alpha)_D$ equal to about $-91.5°$.

8. A process of producing a provitamin D which in its pure state has a melting point of about 143° C. to about 146° C. and a specific rotation in benzene of $(\alpha)_D$ equal to about $-127°$ and whose acetate has a melting point of about 150.5° C. to about 154.5° C. and a specific rotation in benzene of $(\alpha)_D$ equal to about $-87°$, which comprises extracting the fatty material from mussels, saponifying said fatty material with a saponifying agent, and extracting therefrom the unsaponifiable portion with an organic solvent.

9. A process of producing a provitamin D which in its pure state has a melting point of about 150° C. to about 151° C. and a specific rotation in benzene of $(\alpha)_D$ equal to about $-133°$ and whose acetate has a melting point of about 155° C. to about 159° C. and a specific rotation in benzene of $(\alpha)_D$ equal to about $-91.5°$ C. which comprises extracting the fatty material from mussels, saponifying said fatty material with a saponifying agent, and extracting therefrom the unsaponifiable portion with an organic solvent.

10. A process of producing vitamin D comprising the step of antirachitically activating a provitamin D derived from Tubifex which provitamin in its spectroscopically pure state has a melting point of about 143° C. to about 146° C. and a specific rotation in benzene of $(\alpha)_D$ equal to about $-127°$ and whose acetate has a melting point of about 150.5° C. to about 154.5° C. and a specific rotation in benzene of $(\alpha)_D$ equal to about $-87°$.

11. A process of producing vitamin D comprising the step of antirachitically activating a provitamin D derived from earthworms which provitamin in its spectroscopically pure state has a melting point of about 150° C. to about 151° C. and a specific rotation in benzene of $(\alpha)_D$ equal to about $-133°$ and whose acetate has a melting point of about 155° C. to about 159° C. and a specific rotation in benzene of $(\alpha)_D$ equal to about $-91.5°$.

12. A process of producing vitamin D comprising the step of antirachitically activating a provitamin D derived from mussels which provitamin in its pure state has a melting point of about 149.5° C. to about 150° C. and a specific rotation in benzene of $(\alpha)_D$ equal to about $-118°$ and whose acetate has a melting point of about 160° C. to about 161° C. and a specific rotation in benzene of $(\alpha)_D$ equal to about $-78°$.

ALBERT GERHARDUS BOER.
JOHANNES VAN NIEKERK.
ENGBERT HARMEN REERINK.
AART VAN WIJK.

---

CERTIFICATE OF CORRECTION.

Patent No. 2,163,659.   June 27, 1939.

ALBERT GERHARDUS BOER, ET AL.

It is hereby certified that error appears in the printed specification of the above numbered patent requiring correction as follows: Page 1, first column, line 51, for the word "has" read had; page 2, first column, line 48, after "of" insert the; page 4, first column, line 75, for "0.96% gram" read 0.96 gram; page 5, second column, line 10, for the word "eliminate" read climatic; line 73, for "40,00" read 40,000; page 6, second column, line 65, claim 6, for "Tubifex" read tubifex; line 71, same claim, for the word "equals" read equal; page 7, first column, line 14, claim 8, for "mussels" read tubifex; line 26, claim 9, for "mussels" read earthworms; and that the said Letters Patent should be read with this correction therein that the same may conform to the record of the case in the Patent Office.

Signed and sealed this 8th day of August, A. D. 1939.

(Seal)   Leslie Frazer,
Acting Commissioner of Patents.